United States Patent

[11] 3,581,152

[72] Inventor Lloyd F. Hunt
 221 Rocky Point Road, Palos Verdes
 Estates, Calif. 90274
[21] Appl. No. 19,750
[22] Filed Mar. 16, 1970
[45] Patented May 25, 1971

[54] GROUND PROTECTION AND DETECTING FOR HIGH VOLTAGE DC TRANSMISSION SYSTEM
 10 Claims, 3 Drawing Figs.
[52] U.S. Cl............................................. 317/18D,
 307/94, 324/115, 340/248C, 340/255
[51] Int. Cl.......................................... H02h 3/16
[50] Field of Search........................... 317/18 D;
 307/94; 340/255, 248 C; 324/115

[56] References Cited
 UNITED STATES PATENTS
 3,454,783 7/1969 Hunt .......................... 307/94

Primary Examiner—James D. Trammell
Attorney—Jones and Lockwood

ABSTRACT: A grounding system for high voltage DC transmission lines which provides protection for and detection of changes in the normal operating mode of the high voltage system. The transmission system has a single connection to the earth, at a first point, all other points remote from the first being insulated from their local earth points. Common ground points are provided for all the equipment of the transmission system in each particular area, and these common ground points are then referenced by way of a return line to the single earth connection. Current sensitive means are provided at the single earth connection and voltage sensitive means are provided at the remote locations to detect fault conditions and, where necessary, to shut down the system.

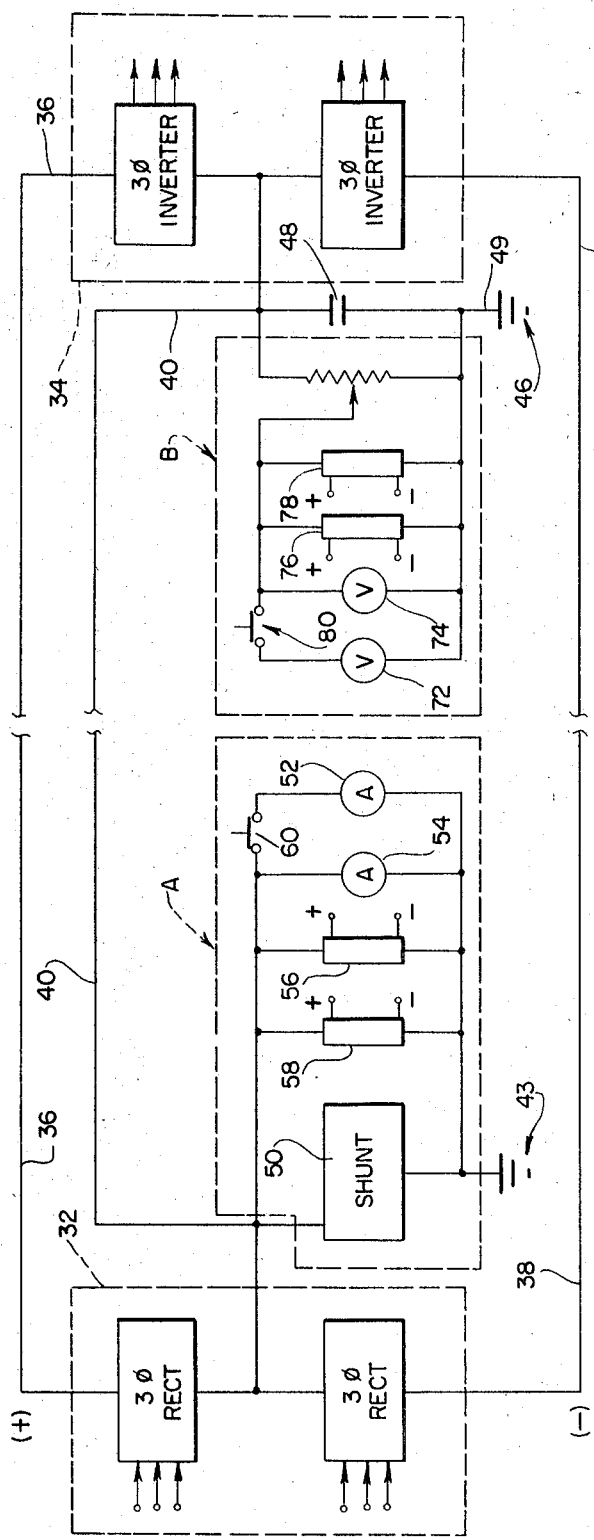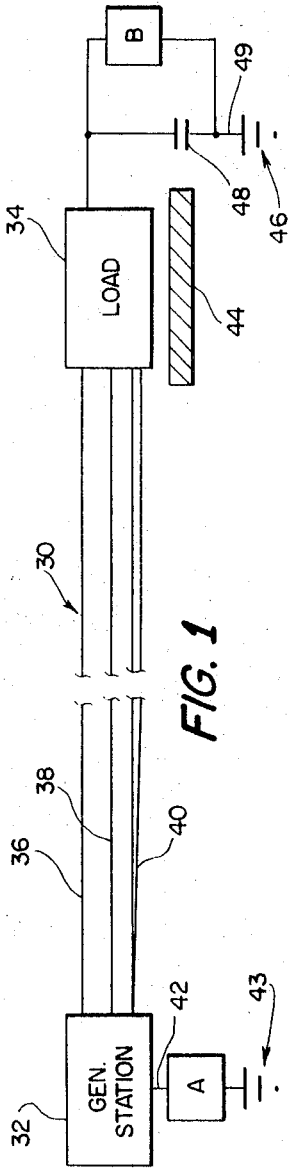
INVENTOR
LLOYD F. HUNT
BY Beale and Jones
ATTORNEYS

GROUND PROTECTION AND DETECTING FOR HIGH VOLTAGE DC TRANSMISSION SYSTEM

FIELD OF THE INVENTION

The present invention relates to an improvement in a high voltage DC transmission system of the type disclosed in my prior U.S. Pat. No. 3,454,783.

Briefly described, Pat. No. 3,454,783 discloses the concept of utilizing a single earth point for a high voltage DC transmission system. The system utilizes three conductors in the transmission line: a positive conductor, a negative conductor and an insulated ground connection conductor. The ground connection conductor provides an earth reference between the generating station and the load and is insulated from local earth points. The present invention provides means for detecting any change in the normal operation procedure of such a system and automatically sounds an alarm as well as reacting to protect the system when it is in an abnormal state.

DESCRIPTION OF PRIOR ART

Adequate detection of faults comprises an important part of DC transmission, for often faults can go undetected for some time. The advantage of DC transmission is its greater reliability when compared to AC transmission, for in a DC system, if either the positive or negative conductor should become faulted, the system can continue to operate between the remaining conductor and ground, providing one-half of the rated voltage to the load. Of course, such a situation should only be permitted to continue as a safety device and never as the normal mode of operation. Therefore, detection of such a fault with immediate and automatic response is essential in order that the transmission system may be restored to complete effectiveness without any inherent delay. Where the failure consists of a fault between either the positive or the negative line, and earth, as by a fault between a transmission line and the supporting metal tower there may result a high current flow which may seriously damage the system. In this case, the fault detection equipment must react quickly and reliably, and the need for such systems is well known. Many fault detection systems have been constructed to provide the necessary protection for known transmission line systems. However, none of the present protection systems are equipped to operate with a DC transmission system of the type disclosed in my above-mentioned patent.

SUMMARY OF THE INVENTION

It is, therefore, an object of the present invention to provide a protection system for detecting any changes in the conducting operation of a DC transmission system which cause the operating characteristics to be outside the normal operating ranges.

Another object of this invention is to provide a detection system which produces immediate and automatic response to a fault condition if such a situation should occur.

Briefly, the present invention provides an improved metering system to carry out the foregoing objects in a DC transmission system having a universal earth connection. Current sensitive means are provided at the earth connection comprising a pair of parallel ammeters and a pair of parallel relays, all four of which are polarized. The ammeters are effective to detect the presence and amount of any current in the earth connection, the relays responding to sound an alarm or shut down the system when necessary.

At any common points remote from the earth connection, an insulated local earth point is required, and a second metering system is provided at each said point to indicate the presence of any sudden surges absorbed at that point. Voltage sensitive means are provided at the insulated local earth comprising a pair of parallel voltmeters and a pair of parallel relays, all four of which are polarized. The common points preferably include a capacitive means connected between the ground for the common point and the local earth point to provide a path to earth for sudden or variable current surges. Regarding the detection means, the voltmeters are effective to detect the presence and amount of any voltage across the capacitor mentioned, the relays responding to sound an alarm or shut down the system when necessary.

In both the current sensitive means at the earth connection and the voltage sensitive means at the insulated local earth, one of the meters, having the smallest fractional scale value, is operable only by a switching means controlling its entrance to the circuit. These switching means allow for periodic monitoring of normal ground currents without subjecting the meters to damage from fault conditions which may occur.

BRIEF DESCRIPTION OF DRAWINGS

The foregoing and additional objects, features and advantages of the invention will best be understood and appreciated from the following detailed description of a preferred embodiment thereof, selected for purposes of illustration and shown in the accompanying drawings in which:

FIG. 1 is a diagrammatic illustration of a high voltage DC transmission system of the type with which the present invention is used;

FIG. 2 is a schematic diagram illustrating in detail the common ground detection system of the present invention; and FIG. 3 is a schematic diagram illustrating in detail the local ground detection system of the present invention.

DESCRIPTION OF PREFERRED EMBODIMENT

Referring now to FIG. 1 of the drawings, there is illustrated at 30 a high voltage direct current transmission line of the type for which the present invention will provide detection and protection. The transmission line 30 is connected between a generating station 32 and a load center 34 by positive and negative conductors 36 and 38. This type of transmission line also includes a third conductor 40, which is the ground conductor for the system, and in a typical system, all three lines will be suspended by means of suitable insulators from conventional transmission towers. All equipment of the system remote from a single earth connection is carefully insulated from ground, and referenced by way of ground conductor 40 to the earth connection at 42. The ground connector is insulated from all earth points except the common point, whereby all grounding of the system is accomplished at a single earth point. In FIG. 1 the earth connection 42 leads to a common earth point 43 which is shown to be at the generator station 32; however, simple modifications of this embodiment would be to provide the earth connection at the load or to insert the earth connection 42 at any point between the generator station 32 and the load 34 by connecting it to the insulated ground connection conductor 40. This modification would, of course, require local grounding of the equipment at both ends of the line and insulation of both the generator and the load from local earth points. Referring back to FIG. 1, insulation 44 is provided to prevent local earthing of the transmission system equipment at points other than the single common point 43. The insulation 44 is of sufficient strength to prevent current flow from the local ground at ground conductor 40 to the local earth point 46. A large capacitor 48 would normally be connected between the insulated equipment at 34 and local earth point 46 by way of local earth line 49 to absorb switching surges, lightning and the like while preventing the flow of direct current. This feature permits use of the fault detection system described herein. Fault detection and metering systems A and B, which will be described further hereinbelow, are shown as being connected in the common earth connection 42 and local earth line 49, respectively. System A is to be connected in the single common earth line 42, while system B is to be connected in any local earth lines, as in line 49.

FIG. 2 indicates in a schematic manner the metering system of FIG. 1 designated by the letter A, and comprises the detection and protection means for the common earth connection 42. As shown in this Figure, a shunt 50 is connected in series with line 42. The shunt 50 may be of any known type which would be suitable for feeding a set of parallel ammeters 52 and 54 and thus may comprise a fixed, variable, or tapped resistor or even an open line. The percentage scale of the ammeters with respect to full ground current will be the only factor dependent on the type and impedance value of the shunt selected. The meters 52 and 54 are center zero indicating ammeters and are connected in parallel with each other and with shunt 50. Also connected across shunt 50 are two polarized relays 56 and 58.

The first ammeter 52 of fault detector A is a sensitive meter which reads at full scale about ten percent of the full transmission current possible in the system, while the second ammeter 54 has full scale deflection when the maximum transmission current flows to earth point 43. The first ammeter 52 is normally disconnected from the line, but is operable by means of a series push button switch 60. The second ammeter 54 is connected in the circuit at all times.

The first relay 56 in fault detector A senses any small currents in line 42 and sounds an alarm when the current in the common earth connection reaches a predetermined value that is substantially less than the full fault current that would flow if one of lines 36 or 38 were faulted to ground. Since this is a polarized relay, it will provide an indication of whether a positive or negative line fault has occurred. The second relay 58 shuts off either the positive or negative line 36 or 38, as by cutting off the corresponding rectifier circuit at the generator 32, depending on which line the polarized relay 58 detects as having a fault. This relay operates when a predetermined percentage (approximately 75 percent) of the full load current is sensed in the earth connection 42, and thus will operate after relay 56 has sounded its alarm.

FIG. 3 indicates in a schematic manner the metering system of FIG. 1 which is designated by the letter B and which comprises the protection and detection means for the local earth line 49 leading to the earth point 46. As shown, a tapped resistor 70 is connected across the shunt capacitor 48 which, as mentioned, is provided to permit alternating currents to be earthed locally. The resistance value of resistor 70 is sufficiently high to prevent any appreciable DC leakage to earth. Connected between the tap point on resistor 70 and the local earth point are two voltmeters 72 and 74 and two polarized, voltage responsive relays 76 and 78, the voltmeters and relays being in parallel with each other. One of the voltmeters, such as meter 74, provides about 75 percent of full scale reading, depending on the tapping point of resistor 70, when either of the transmission lines 36 or 38 is deenergized by reason of an intervening ground fault. The other voltmeter 72 reads about 10 percent of the scale reading of meter 74 and is only connected in the circuit by operating a series push button switch 80. One of the relays, such as 76, operates at the voltage value which would produce a predetermined deflection of voltmeter 72 to sound an alarm, while the other relay 78 trips the system upon occurrence of a predetermined fault. This tripping of the system at the load end may be accomplished, for example, by disconnecting an inverter for either the positive line or the negative line at the load end, the particular inverter tripped being indicated by the polarity response of the relay.

To indicate the operation of the system, an exemplary occurrence may be described. Full load current exists in transmission lines 36 and 38 during normal operation of the system. At this time no current flows in the common earth connection line 42. It will be understood that in high voltage transmission systems it is conventional practice to suspend the transmission lines by means of insulators carried on the arms of a supporting tower. Thus, the transmission lines 36 and 38 as well as the return, or ground connection conductor 40 may be suspended from single insulators, or from insulator pairs with a jumper interconnecting the two adjoining lines, the particular insulator arrangement being immaterial as long as the lines are maintained the necessary distance from the towers.

The most common fault in such a system occurs when the load current flashes over the insulator and a fault is developed between line 36 or 38 and the tower, which is earthed. When an insulator flashes over in this manner, current flows from the common earth connection point 43 through the metering system A in line 42 down the faulted line 36 or 38 and through the fault to, e.g., the tower and thence to the earth at the tower base. The present system is designed to detect this type of condition, since 90 percent of all failures in a system of this type are line-to-earth faults.

Relay 56 detects the presence of a current in line 42 and sounds an alarm while also indicating which of the two lines 36 or 38 is faulted. Examining the flow of current traced above, the system is generating one-half of the rated voltage to substantially zero load; therefore, the current value becomes large quickly and relay 58 reacts to disconnect the appropriate line 36 or 38.

The system, with one of its two transmission lines disconnected, continues to supply the remaining one-half of the normal voltage to one-half of the usual load. This results in an operating current which is identical to the rated operating current under normal conditions.

Detection means B is used to note any sustained leakage to local earth point 46. If a sudden surge of lightning should strike the load end 34 of the system, this surge can be grounded locally via capacitor 48 without any noticeable charge buildup across the capacitor. However, if capacitor 48 should maintain any appreciable charge buildup, such as may exist as a result of a faulty inverter causing unbalanced inverter output voltage, this buildup will be detected by voltmeters 72 and 74 and voltage responsive relays 76 and 78 in a manner similar to current detection means A.

Another fault condition that may exist in the transmission lines 36, 38, 40 could be triggered in strong winds, where conductors 36 or 38, suspended in the above-mentioned manner, could be blown against the tower. In this event, metering system A would detect substantially the same fault as would be exemplified by a flash-over to the tower. Faults may also be produced by derricks in the line, trees growing too close to the line, by people accidentally hitting the lines with metal poles, or the like, all of which will produce a current from the line to earth, whereby the detector means will sense the occurrence.

Thus, there has been described a novel and effective means for detecting fault conditions in a DC transmission system of the type which utilizes a single common earth connection. Although a single embodiment of the invention has been shown and described, variations and modifications will be apparent to those skilled in the art. It is, therefore, intended that the invention not be limited to the disclosed embodiment, the true spirit and scope thereof being set forth in the following claims.

I claim:

1. In a system for protection and supervision of a high voltage DC transmission system having a positive and a negative line, a single common earth point, insulated local earth point remote from said common earth point, and a ground connection conductor from said remote local earth to said common earth point;

first detection means connected between said ground connection conductor and said single common earth point to detect any changes in the normal ground current and to provide automatic response thereto;

capacitor means connected between said transmission system and said local earth to ground any alternating current components locally while preventing grounding of any DC current at said local earth point; and second detection means connected across said capacitor means to detect any sustained current components absorbed at said local earth, said second detection means being voltage sensitive to provide automatic response to said components.

2. The system of claim 1, wherein said first detection means comprises a shunt means feeding two parallel polarized ammeters and two parallel polarized relays.

3. The system of claim 2, wherein the first of said ammeters records full deflection at full ground current, and the second ammeter reads a fractional percentage of full ground current, said first detection means further including a first switching means in series with said second ammeter for selectively connecting said second ammeter into said system.

4. The system of claim 3, wherein a first of said relays sounds an alarm upon sensing a small ground current, and the second relay disconnects one of the positive or negative transmission lines when a heavy ground current occurs.

5. The system of claim 1, wherein said second detection means comprises a variable resistive means feeding two parallel polarized voltmeters and two parallel polarized relays.

6. The system of claim 5, wherein a first of said voltmeters reads a fractional percentage of any voltage across said capacitor, said percentage being established by said resistive means, switch means for selectively connecting said second voltmeter in parallel with said resistive means, said second voltmeter reading a fractional percentage of the reading of said first voltmeter.

7. The system of claim 6, wherein a first of said relays is adaptable to sound an alarm upon detection of a small voltage across said resistive means, the second of said polarized relays disconnecting one of said first and second DC transmission lines when a predetermined voltage occurs.

8. The system of claim 4, wherein said second detection means comprises a variable resistive means feeding two parallel polarized voltmeters and two parallel, voltage-sensitive polarized relays.

9. The system of claim 8, wherein a first of said voltmeters reads a fractional percentage of any voltage across said capacitor, said percentage being established by said resistive means, switch means for selectively connecting said second voltmeter in parallel with said resistive means, said second voltmeter reading a fractional percentage of the reading of said first voltmeter.

10. The system of claim 9, wherein the first of said voltage-sensitive relays is adapted to sound an alarm upon detection of a small voltage across said resistive means, the second of said voltage-sensitive polarized relays disconnecting one of said first and second DC transmission lines when a predetermined voltage occurs.